W. T. POMRANKE.
BEET TOPPING MACHINE.
APPLICATION FILED APR. 7, 1916.
1,241,761.
Patented Oct. 2, 1917.
2 SHEETS—SHEET 1.
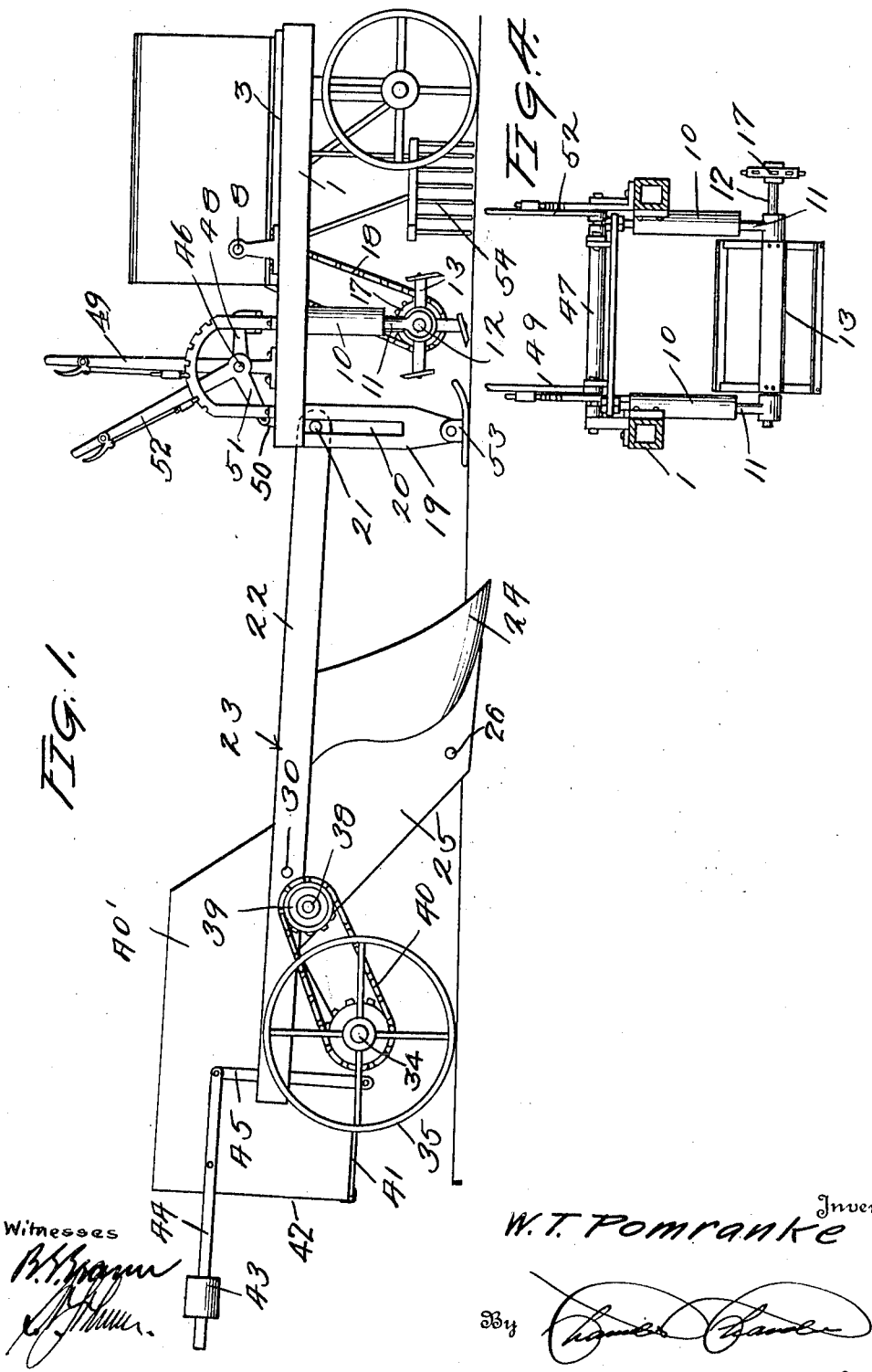
Witnesses
Inventor
W. T. Pomranke
By
Attorney

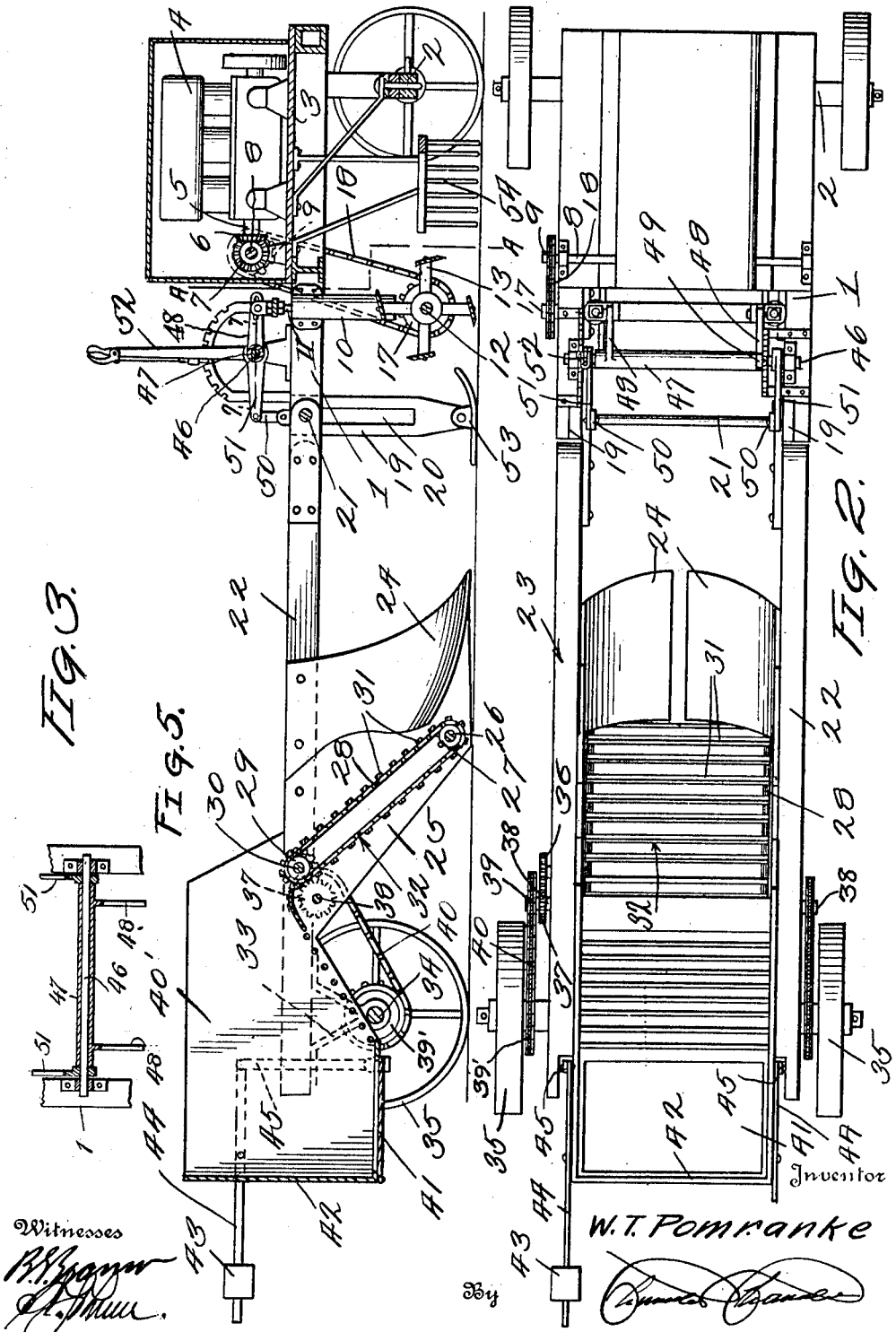

UNITED STATES PATENT OFFICE.

WALTER T. POMRANKE, OF CHILTON, WISCONSIN.

BEET-TOPPING MACHINE.

1,241,761.  Specification of Letters Patent.  Patented Oct. 2, 1917.

Application filed April 7, 1916. Serial No. 89,677.

*To all whom it may concern:*

Be it known that I, WALTER T. POMRANKE, a citizen of the United States, residing at Chilton, in the county of Calumet, State of Wisconsin, have invented certain new and useful Improvements in Beet-Topping Machines; and I do hereby declare the following to be a full, clear, and exact description of the invention, such as will enable others skilled in the art to which it appertains to make and use the same.

The present invention is directed to improvements in the manner of adjusting one frame upon another and has for one of its objects to provide a simple and inexpensive adjustment for said frames, one of which is preferably adapted to support beet topping means while the other supports beet digging devices.

With this and other objects in view, this invention resides in the novel features of construction, formation, combination and arrangement of parts to be hereinafter more fully described, claimed and illustrated in the accompanying drawing, in which:—

Figure 1 is a side elevation of the machine.

Fig. 2 is a top plan view.

Fig. 3 is a longitudinal sectional view through the same.

Fig. 4 is a sectional view on line 4—4 of Fig. 3.

Fig. 5 is a sectional view on line 7—7 of Fig. 3.

Referring to the drawing 1 indicates a frame, which is supported at its forward end by a wheeled axle 2, said frame having mounted thereon a platform 3 upon which is fixed the gas engine 4, the shaft 5 of which is provided with a beveled gear 6, said gear being in mesh with the gear 7 which is fixed to the shaft 8 disposed transversely of the frame 1, the latter shaft having one end provided with a sprocket wheel 9, the purpose of which will appear later.

Supported by the side bars of the frame 1 are depending sleeves 10, said sleeves having mounted therein hangers 11, said hangers having their lower ends connected to the shaft 12 which supports the cutting wheel 13.

Fixed to the shaft 12 is a sprocket wheel 17 which is connected to the sprocket wheel 9 by the sprocket chain 18 which transmits movement to the shaft 12 and thus the cutting wheel when the motor is in motion.

Depending from the rear end of the side bars of the frame 1 are plates 19, said plates having vertical slots 20 formed therein, in which are slid the ends of the transverse shaft 21, said shaft having its ends pivotally connected to the forward ends of the side bars 22 of the frame 23.

A pair of digging shovels or plows 24 are supported by the side bars 22 of the frame 23 and have their adjacent edges spaced so as to provide a passage therebetween, as is usual. Also fixed to the side bars 22 of the frame 23 are fenders 25, said fenders being preferably formed from sheet metal.

A transverse shaft 26 is supported by the lower ends of the fenders 25 and has fixed thereto sprocket wheels 27 which are engaged by the sprocket chains 28, said chains being also trained around the sprocket wheels 29 which are fixed to the ends of the transverse shaft 30, said shaft being supported transversely of the frame 23.

The chains 28 are connected by cross strips 31, and provide in conjunction with the chains 28 an endless conveyer 32.

Brackets 33 are connected to the side bars 22 of the frame 23, adjacent their rear ends and rotatably support the axle 34, said axle having fixed thereto ground wheels 35.

To one end of the shaft 30 is fixed a gear 36, said gear being in mesh with the gear 37 which is engaged with the shaft 38, said shaft being supported by the frame 23. Fixed to the shaft 38 is a sprocket wheel 39 which has trained therearound a sprocket chain 40, said chain being also engaged with the sprocket 39' fixed to the axle 34. Thus it will be seen that when the axle 34 is rotated, the shaft 30 will be also rotated, thus causing the endless conveyer 32 to travel so that as the beets are removed by the shovels 24, the same will be directed to the conveyer 32 and carried to the hopper 40', which is supported by the rear end of the frame 23, said hopper having a trap door 41 hingedly connected to its rear wall 42.

The trap door 41 is normally held in its closed position by the weights 43, said weights being adjustably connected to the bars 44, which are pivotally connected to the sides of the hopper and are pivotally connected to the bar 41 by the links 45. Thus it will be seen that when a predetermined weight has been deposited upon the trap door 41, the same will automatically open, thus discharging the load.

Supported transversely of the frame 1 is a shaft 46, said shaft having mounted thereon a sleeve 47, which is provided with spaced arms 48, the forward ends of said arms being slidably and pivotally connected to the upper ends of the hangers 11.

The sleeve 47 has connected thereto a hand lever 49, whereby the same can be actuated to raise or lower the hangers 11, and thus regulate the cutting action of the wheel 13.

The shaft 21 is provided with links 50 which are pivotally connected to the arms 51 carried by the levers 52, said levers being operable to raise or lower the shaft 21 thereby regulating the digging action of the shovels 24.

The plates 19 have connected to their lower ends shoes 53 which serve to prevent the frame 1 from tilting.

A rake 54 is supported by the forward end of the frame 1 and serves to remove any obstructions which may lie in the path of travel of the machine.

What is claimed is:

1. A machine of the class described, comprising a frame, slotted plates depending therefrom, ground engaging shoes carried by said plates, and a second frame having a shaft slidably engaged in the slots in said plates.

2. A machine of the class described, comprising a frame, slotted plates depending therefrom, ground engaging shoes carried by said plates, a second frame having a shaft slidably engaging in the slots in said plates, and means on the first named frame for vertically adjusting said shaft to raise and lower the forward end of the second named frame.

In testimony whereof, I affix my signature, in the presence of two witnesses.

WALTER T. POMRANKE.

Witnesses:
  AUGUST N. SCHEWE,
  JOSEPH GRUBER.

Copies of this patent may be obtained for five cents each, by addressing the "Commissioner of Patents, Washington, D. C."